United States Patent [19]
Fitzner et al.

[11] 3,729,096
[45] Apr. 24, 1973

[54] APPARATUS FOR PROCESSING HERBS AND THE LIKE

[76] Inventors: Marcel Fitzner, 3003 East Ina, Tucson, Ariz. 85718; John D. Butler, 211 West Franklin, Tucson, Ariz. 85701

[22] Filed: June 2, 1972

[21] Appl. No.: 259,249

[52] U.S. Cl. ...................209/97, 209/86, 209/296, 209/372, 209/374, 209/393, 209/406, 241/85
[51] Int. Cl. ...............................................B07b 1/22
[58] Field of Search......................209/86, 94, 95, 97, 209/288, 293, 406, 296, 372, 299, 374, 393, 370; 130/30; 241/85, 91

[56] References Cited

UNITED STATES PATENTS

| | | | |
|---|---|---|---|
| 1,417,849 | 5/1922 | Maiers | 209/370 |
| 3,184,171 | 5/1965 | Daman | 241/85 X |
| 3,241,667 | 3/1966 | Grosbety | 209/86 X |

*Primary Examiner*—Richard A. Schacher
*Attorney*—William C. Cahill et al.

[57] ABSTRACT

In order to separate the leaves of a herb or herblike plant from the seeds and twigs thereof, a longitudinally slatted cylindrical container is filled with the unprocessed plants, and the cylinder is then disposed in an outer container such that it may be rotated about its axis. The separation between adjacent slats is predetermined to be no larger than the smallest seeds which might be expected within the unprocessed mixture. As the cylinder is rotated, the leaves drop into the outer cylinder leaving the seeds and any twigs within the cylinder. For fabrication purposes, the cylinder may actually take the form of a very slightly tapered truncated cone, which shape provides draft for removal of the cylinder from its fabrication mold.

5 Claims, 3 Drawing Figures

Patented April 24, 1973

3,729,096

APPARATUS FOR PROCESSING HERBS AND THE LIKE

Our invention relates to apparatus for processing herb and herblike plants and, more particularly, to apparatus for separating the leaves of such plants from their seeds, twigs, and the like.

Many useful herbs may be grown at home or purchased in an unprocessed condition such that it is necessary to separate the leaves, which are generally the desirable herb portion, from its seeds and any twigs or the like contained in the unprocessed mixture. A growing number of persons prefer either growing their own herbs, for seasoning food, brewing herbal tea, etc., or purchasing the same in an unprocessed condition from healthfood stores or other sources. However, the unprocessed herb mixture must be processed by hand to segregate the desirable leafy portions, a procedure that is both time consuming and tedious.

It is therefor a broad object of our invention to provide apparatus for readily separating the leafy portions of herbs from the seeds and other undesirable portions thereof.

It is another object of our invention to provide such apparatus which is very efficient yet extremely simple to operate.

It is yet another object of our invention to provide such apparatus which may be readily and inexpensively fabricated.

A still further object of our invention is to provide such apparatus which is capable of processing a wide variety of herbs including those used in the preparation of herbal teas, in food seasoning, and the like.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
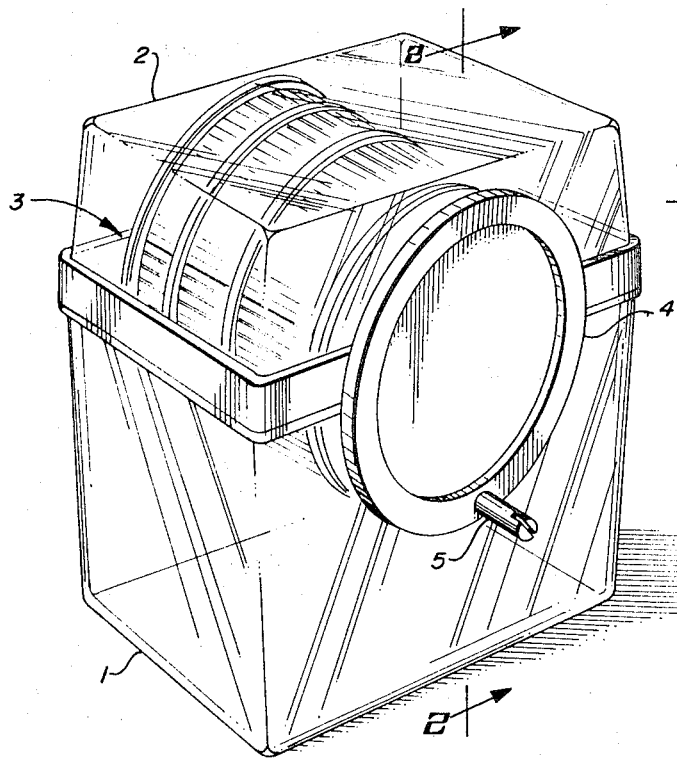
FIG. 1 is a perspective view of the assembled apparatus constituting a presently preferred embodiment of our invention.

Referring now to FIG. 1, it will be observed that the processing apparatus includes a lower container portion 1 and an upper container portion 2 between which a generally cylindrical inner container 3 is suspended. Crank means comprising an outer wheel 4 and a handle 5 are coupled directly to the inner container 3 and the outer wheel 4 is coaxial therewith such that rotating the outer wheel 4 by actuating the handle 5 rotates the inner container 3 accordingly.

Figure 2:
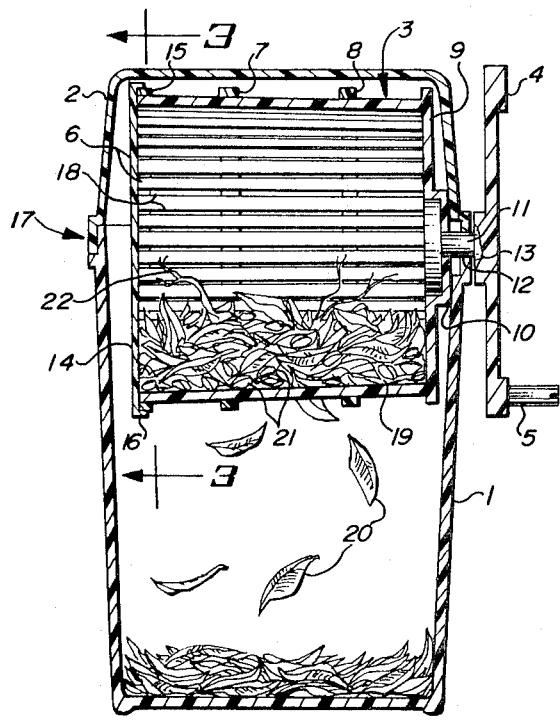
FIG. 2 is a cross-sectional view taken along the lines 2—2 of the apparatus of FIG. 1 illustrating the internal construction thereof and its manner of operation.

The internal structure of the apparatus may be more readily understood with reference to FIG. 2. The inner container 3 includes a plurality of circumferentially equally distributed slats 6 positioned with respect to one another by circumferential support rings 7 and 8 which are preferably, as will be noted in further detail below, integral with the slats 6. The end of the inner container 3 nearest the outer wheel 4 is closed off by an imperforate end member 9 having a shoulder portion 10 bearing against the inner surfaces of the lower container portion 1 and the upper container portion 2 whereby the inner container 3 is maintained generally horizontal when the apparatus is assembled.

An axle member 11 extends through a journal opening 12 at the junction point of the lower container portion 1 and the upper container portion 2 to couple the end member 9 to the outer wheel 4 which also has a shoulder portion 13 functioning as a thrust bearing against the outer surfaces of the container portions 1 and 2. Only sufficient endplay is provided to permit rotating the inner container 3 without binding in order that the inner container is maintained generally horizontal.

The end of the inner container away from the imperforate end member 9 is covered, during the processing function, with an imperforate cap member 14 which is configured to snap onto outboard ring member 15 which is shaped to lock with the lip portion 16 of the cap member 14.

The lower container portion 1 and the upper container portion 2 fit together at their junction points as indicated generally at 17 with the exception, previously explained, of the journal opening 12 which is, of course, cylindrical to accommodate the axle 11 when the apparatus is assembled.

It may be noted that the inner container 3 is illustrated in FIG. 2 as being a truncated cone rather than a cylinder. It has been found that this specific configuration lends itself to fabrication utilizing contemporary plastic casting and molding techniques; however, it should be understood that it is not necessary for the inner container 3 to deviate from the purely cylindrical shape and, from functional considerations, the shape of the inner container 3 should reasonably approximate a cylinder in order that the spacing 18 between the slats 6 may be maintained even throughout their length by slightly tapering the slats 6 in accordance with the draft necessary to facilitate removal from a male mold portion.

Figure 3:
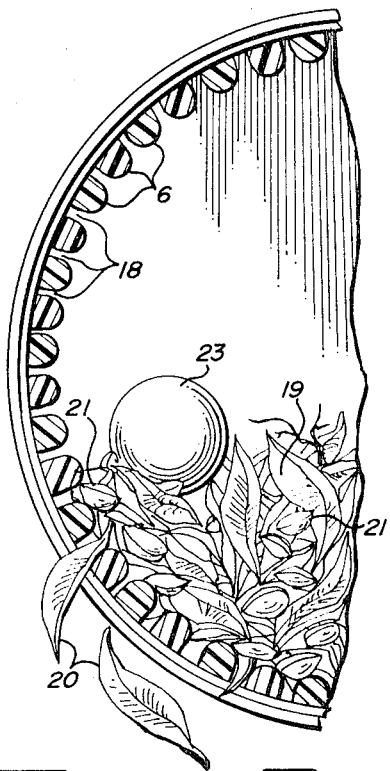
FIG. 3 is a partially cutaway cross-sectional view taken along the lines 3—3 of FIG. 2 further illustrating the internal construction of the processing apparatus and the manner in which it functions to segregate the useful portions of an herb mixture.

Operation of the apparatus may best be understood by simultaneously referring to FIGS. 2 and 3. The lower and upper container portions 1 and 2 are separated and the unit including the inner container 3 and outer wheel 4 is lifted off the lower container portion. The cap member 14 is snapped off the outboard member ring 15 in order that an unprocessed herb mixture 19 may be introduced into the interior of the inner container 3 after which the cap member 14 is snapped back into place. The rotary unit including the inner container 3 and the outer wheel 4 is placed into position by inserting the axle member 11 into the lower portion of the journal opening 12 after which the upper container portion 2 is repositioned to complete reassembly of the apparatus and place it into operating condition. The outer wheel 4, and hence the inner container 3, are rotated utilizing the handle 5 whereupon the unprocessed herb mixture 19 will tumble within the inner container 3 and the leafy portions 20 thereof pass through the spaces 18 between the slats 6 and settle to the bottom of the lower container portion 1 leaving the seed portions 21, twigs 22, and other portions of the unprocessed mixture 19 too large to pass through the openings 18 within the inner container 3.

For some varieties of herbs, it is desirable that the leafy portions 20 be dried and broken into rather small pieces for ultimate use. The apparatus as so far described will process such dried mixtures readily although it is sometimes necessary to manually crush the leafy portions remaining in the unprocessed mixture 19 to effect a full recovery of the desired leafy portions 20. This involves reopening the inner container 3, pinching the unprocesssed mixture 19 between the fingers and thumbs several times and returning the remainder of the unprocessed mixture 19 to the inner container 3 for further tumbling. While this additional step can be carried out in a matter of seconds, an acceptable alternative for many herbs which can be pulverized without diminishing their effect in seasoning, brewing, etc., is to introduce one or more clean marbles 23 or similar objects along with the unprocessed mixture 19.

As the unprocessed mixture 19 tumbles, the marbles 23 will break up the brittle leafy portions 20 into smaller pieces which will readily pass through the spacings 18 without affecting the seeds 21 or twigs 22.

While the containers 1, 2, and 3 can be any reasonable size, the width of the spacing 18 between adjacent ones of the slats 6 must be quite uniform and as a practical matter should not exceed 0.05 inches. Further, in order to insure reasonable rigidity of the inner container 3, the width of the slats 6 should be a minimum of 0.06 inches and, as previously noted, should taper to become slightly thicker toward the end which receives the cap member 14 in order that the spacing 18 between adjacent slats remains substantially uniform. The inwardly directed surfaces of the slats 6, as shown in cross-section in FIG. 3, are curved to assist the leafy portions 20 to thread their way through the spacings 18 and also as a practical consideration in fabrication. It will be understood that the width of the spacing 18 which should be no more than 0.05 inches refers to the narrowest portion thereof regardless of the cross-sectional shape of the slats 6 which might, for example, be circular. The support rings 7 and 8 are preferably cast integral with the slats 6.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

We claim:

1. Apparatus for separating the leafy portions of herbs and herblike plants from the seeds and twigs thereof comprising:
   a. an outer container, said outer container including:
      1. a lower container portion opening upwardly;
      2. an upper container portion opening downwardly;
      3. said lower and said upper portions being configured and dimensioned about the peripheries of their openings to fit together whereby said lower container portion supports said upper container portion;
      4. said lower and upper container portions, when jointed together, having a generally cylindrical journal opening through one side thereof at the interface therebetween;
   b. an inner container, said inner container including:
      1. an array of circumferentially equally distributed slat members;
      2. an imperforate end member;
      3. an axle member extending outwardly from said imperforate end member and disposed coaxially with respect to said array of circumferentially distributed slat members;
      4. crank means coupled to said axle for rotating said inner container; and
      5. a removable cap member normally closing off the end of said inner container opposite the end member 9.

2. The apparatus of claim 1 in which the maximum spacing between adjacent ones of said slat members if 0.05 inches.

3. The apparatus of claim 2 in which said slat members are held in circular-in-crossection juxtaposition by means of at least one circular support ring to which each slat member is fixed.

4. The apparatus of claim 3 which includes a plurality of said spaced apart support rings, said support rings being integral with said slats.

5. The apparatus of claim 4 in which said array of slat members describes a truncated cone.

* * * * *